United States Patent [19]

Tomita

[11] Patent Number: 5,130,839
[45] Date of Patent: Jul. 14, 1992

[54] SCANNING OPTICAL APPARATUS

[75] Inventor: Kan Tomita, Tokyo, Japan

[73] Assignee: Ricoh Company. Ltd., Tokyo, Japan

[21] Appl. No.: 682,897

[22] Filed: Apr. 9, 1991

Related U.S. Application Data

[63] Continuation of Ser. No. 489,966, Mar. 7, 1990, abandoned.

[30] Foreign Application Priority Data

Mar. 10, 1989 [JP] Japan ................... 1-59325

[51] Int. Cl.[5] .................. G02B 26/08; G02F 1/13
[52] U.S. Cl. .................... 359/205; 359/86; 359/820
[58] Field of Search ............... 350/6.1–6.91, 350/412, 419, 422, 425, 331 R–350 R, 280, 509; 359/196, 197, 205–211, 227–236, 250–256, 36, 43–45, 74–87, 819, 820; 374/100, 124–133; 250/235, 236

[56] References Cited

U.S. PATENT DOCUMENTS

| 4,128,297 | 12/1978 | Bourne | 350/6.1 |
|---|---|---|---|
| 4,323,297 | 4/1982 | Kawamura et al. | 350/6.8 |
| 4,466,701 | 8/1984 | Ogata et al. | 350/336 |
| 4,589,735 | 5/1986 | Saunders | 350/280 |
| 4,733,064 | 3/1988 | Ishikawa | 350/6.8 |
| 4,756,604 | 7/1988 | Nakatsuka et al. | 350/331 R |
| 4,762,397 | 8/1988 | Pepper | 350/347 V |
| 4,861,975 | 8/1989 | Kino et al. | 350/509 |
| 4,872,743 | 10/1989 | Baba et al. | 350/353 |
| 4,896,948 | 1/1990 | Dono et al. | 350/347 V |
| 4,915,484 | 4/1990 | Yamamoto | 350/6.8 |
| 4,916,318 | 4/1990 | Iima | 350/6.8 |
| 4,919,520 | 4/1990 | Okada et al. | 350/347 R |

FOREIGN PATENT DOCUMENTS

| 61-184515 | 8/1986 | Japan | 350/6.8 |
|---|---|---|---|
| 129814 | 6/1987 | Japan | 350/6.1 |
| 129815 | 6/1987 | Japan | 350/6.1 |
| 129816 | 6/1987 | Japan | 350/6.1 |

Primary Examiner—Rodney B. Bovernick
Assistant Examiner—Thong Nguyen
Attorney, Agent, or Firm—Oblon, Spivak, McClelland, Maier & Neustadt

[57] ABSTRACT

A scanning optical apparatus comprises a first imaging optical system for imaging a light beam collimated by a collimating optical system so as to form a linear image. The first imaging optical system includes a vari-focal lens using liquid crystal. A scanning deflector is provided for deflecting a light beam which has emerged from the first imaging optical system and for scanning a target with the light beam in a first direction. Electric circuit is provided for varying focal length of the vari-focal lens by generating changes in orientation properties of crystal liquid of the vari-focal lens in synchronization with the timing of scanning of the deflector. A second imaging optical system is provided for imaging a light beam deflected by the scanning deflector on the target. The second imaging optical system is adapted to maintain a geometrically conjugate relationship between the scanning deflector and the target in a second direction perpendicular to the first direction. A temperature detecting element and a temperature control element are provided for controlling temperature of the vari-focal lens so as to maintain the vari-focal lens at a temperature at which anisotropy of index of refraction of the liquid crystal can be maintained.

2 Claims, 1 Drawing Sheet

SCANNING OPTICAL APPARATUS

This application is a continuation of application Ser. No. 07/489,966, filed on Mar. 7, 1990, now abandoned.

BACKGROUND OF THE INVENTION

The present invention relates generally to a scanning optical apparatus for use in image processing apparatuses such as laser printer, facsimile, or digital copying apparatus. More particularly, the invention relates to a scanning optical apparatus using a liquid crystal lens as a vari-focal lens for imaging a light beam such as a laser beam collimated by the collimating optical system.

There is known a scanning optical apparatus in which a light beam collimated by a collimating optical system is imaged so as to form a linear image which is then deflected by a rotating polygonal mirror having a plurality of light reflection surfaces and imaged on a target surface through a second imaging optical system.

Generally, the scanning optical apparatus utilizing such a polygonal mirror has a problem in that a scanning position on the target surface tends to fluctuate in the sub-scanning direction due to deviations in parallelism of the polygonal mirror surfaces in relation to the rotational axis of the polygonal mirror. In order to correct the deviations, the first imaging optical system is constructed to form a linear image in the vicinity of the mirror surfaces, and the second imaging optical system is constructed to maintain a conjugate relationship in view of geometrical optics between each of the reflection surfaces and the target surface in a sub-scanning direction perpendicular to a main scanning direction.

Accordingly, the second imaging optical system tends to have a property as an anamorphic optical system in that the power of component of a light beam in the sub scanning direction is greater than that of a component thereof in the main scanning direction, and thus a great curvature of field tends to occur in the sub-scanning direction.

The curvature of field in the sub-scanning direction causes the size of a beam spot on the target surface in the sub-scanning direction to be varied with the scanning position thereof. The fluctuation of such a beam spot size causes the high density scanning to be disturbed.

In order to correct deviations in parallelism of the polygonal mirror surfaces in relation to the rotational axis of the polygonal mirror, many attempts to increase the accuracy of the second imaging optical system have been made. However, such attempts have been accompanied with significant difficulties in manufacturing of the optical system.

A scanning optical apparatus for solving the above-mentioned problem has been proposed and disclosed in Japanese Patent Application No. 63-212057, filed by the same applicant, in which a vari-focal liquid crystal lens is used as a first imaging optical system. In this apparatus, focal length of the vari-focal liquid crystal lens is adapted to be varied with the timing of scanning movement of the polygonal mirror surfaces so as to correct the curvature of field in the sub-scanning direction.

In the scanning optical apparatus using the above-mentioned vari-focal liquid crystal lens, an image corresponding to the linear image formed by the first imaging optical system is formed on the target surface due to a geometrically conjugate relationship between each of the mirror surfaces and the target surface in a sub-scanning direction. When the focal length of the first imaging optical system is varied, the linear image formed by the first imaging optical system is shifted along the optical axis thereof. Accordingly, the imaging position of the second imaging optical system in the sub-scanning direction is shifted with changes in the position of the linear image formed by the first imaging optical system in proportion to the longitudinal magnification of the second imaging optical system. This phenomenon is utilized to correct the curvature of field in the sub-scanning direction.

By the way, liquid crystal lens generally have a disadvantage, as described in "VARI-FOCAL LENS WITH LIQUID CRYSTAL" Function Material, December, 1988, in that it exhibits anisotropy of index of refraction or birefringence at relatively low temperature, i.e., lower than 30° to 40° C. and in that it exhibits isotropy thereof at a temperature higher than 40° C. and thus causes the index of refraction not to be changed. Accordingly, in the case that the vari-focal liquid crystal lens is used as the first imaging optical system of the scanning optical apparatus, when the liquid crystal lens is exposed to a temperature higher than 40° C., the liquid crystal lens can not vary the focal length thereof and thus makes it impossible to correct curvature of field in the direction of sub-scanning.

It is known in the art that an internal temperature of the scanning optical apparatus may be raised up to 40° to a range of 50° C. Thus, the above-mentioned problem may occur.

SUMMARY OF THE INVENTION

It is therefore an object of the present invention to provide an improved scanning optical apparatus of the type disclosed in Japanese Patent Application No. 63-212057, which can effect a reliable high-density optical scanning.

Another object of the invention is to provide a scanning optical apparatus which can easily effect a reliable correction of curvature of field in the sub-scanning direction even when an internal temperature of the scanning optical apparatus rises over a suitable temperature.

The above-mentioned objects of the present invention can be achieved by a scanning optical apparatus comprising:

a first imaging optical system for imaging a light beam collimated by a collimating optical system so as to form a linear image, the first imaging optical system including a vari-focal lens using liquid crystal;

a scanning deflector for deflecting a light beam which has emerged from the first imaging optical system and for scanning a target with the light beam in a first direction;

first means for varying a focal length of the vari-focal lens by generating changes in orientation properties of a crystal liquid of the vari-focal lens in synchronization with the timing of scanning of the deflector;

a second imaging optical system for imaging a light beam deflected by the scanning deflector on the target, the second imaging optical system being adapted to maintain a geometrically conjugate relationship between the scanning deflector and the target in a second direction perpendicular to the first direction; and second means for controlling temperature of the vari-focal lens so as to maintain the vari-focal lens at a temperature at which anisotropy of index of the refraction of the liquid crystal can be maintained.

In the scanning optical apparatus having the above-mentioned construction, a light beam collimated by the collimating optical system is imaged so as to form a linear image and then deflected by the scanning deflector toward the target surface. The deflected light beam, incident on the second imaging optical system, is then imaged on the target surface. At this time, an image corresponding to the linear image formed by the first imaging optical system is formed on the target surface due to a geometrically conjugate relationship between each of the mirror surfaces and the target surface in a sub-scanning direction. When the focal length of the vari-focal lens is varied, the linear image formed by the first imaging optical system is shifted along the optical axis thereof.

Accordingly, the imaging position of the second imaging optical system in the sub-scanning direction is shifted with changes in the position of the linear image formed by the first imaging optical system in proportion to the longitudinal magnification of the second imaging optical system. The temperature control means can act to maintain the vari-focal lens, using the liquid crystal, at a temperature at which the lens can maintain anisotropy of index of refraction of the liquid crystal.

Accordingly, it is possible to effect reliable correction of curvature of field in the direction of sub-scanning even when an internal temperature of the scanning optical apparatus rises over a temperature which is suitable for the operation of liquid crystal. As the result, it is possible to provide a scanning optical apparatus which can effect a reliable high-density optical scanning.

Further objects, features and advantages of the present invention will become apparent from the following description of the preferred embodiments of the present invention as illustrated in the accompanying drawings.

DETAILED DESCRIPTION OF THE PREFERRED EMBODIMENTS

Figure 1:
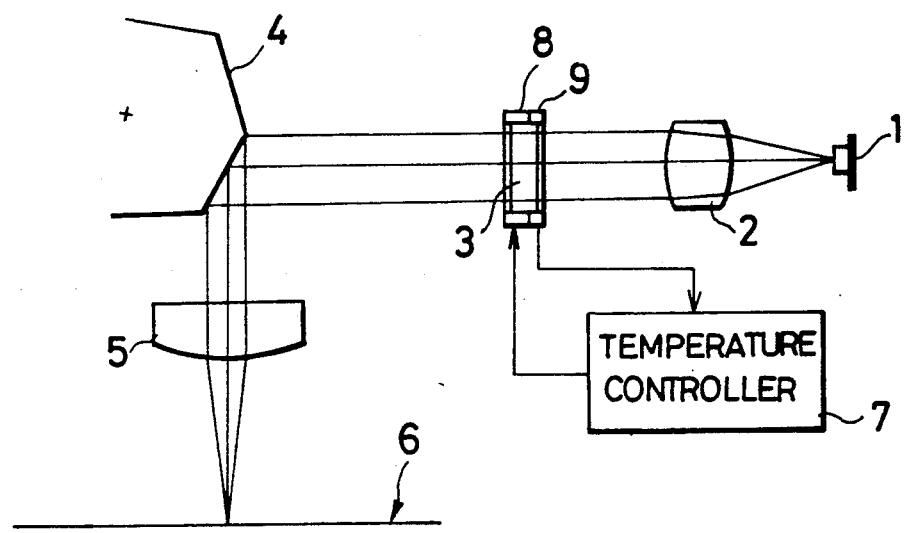
FIG. 1 schematically shows an arrangement of a main part of a scanning optical apparatus according to an embodiment of the present invention.

FIG. 1 schematically shows a main part of a scanning optical apparatus according to an embodiment of the present invention which is applicable to a laser printer, facsimile, digital copying apparatus or the like. Referring to FIG. 1, a scanning optical apparatus comprises a light source 1 which may be a semiconductor laser, a collimating optical system 2 which collimates a light beam emitted from the light source 1, a first imaging optical system 3 for imaging the collimated light beam in the form of a linear image pattern, and a rotating polygonal mirror 4 having a plurality of reflection surfaces for deflecting a light beam which has emerged from the first imaging optical system 3 and for scanning a target surface 6 such as a photosensitive surface. Disposed between the polygonal mirror 4 and the target surface 6 is a second imaging optical system 5 which images the deflected light beam from the polygonal mirror 4 on the target surface 6. The second imaging optical system 5 uses an f θ lens which serves to maintain a conjugate relationship in view of geometrical optics between each of the reflection surfaces and the target surface in a sub-scanning direction perpendicular to a main scanning direction.

The first imaging optical system 3 is constructed by a vari-focal liquid crystal lens which is adapted to vary the focal length with deflection scanning of the reflection surfaces of the rotating polygonal mirror 4.

In the scanning optical apparatus having the above-mentioned construction, a light beam collimated by the collimating optical system 2 is imaged in a linear image form and then deflected by the reflection surfaces of the rotating polygonal mirror 4 during the rotation of the mirror. The deflected light beam is then incident on the second imaging optical system 5.

The second imaging optical system 5 images the deflected light beam on the target surface surface. At this time, in order to correct the influence of deviations in parallelism of the polygonal mirror surfaces in relation to the rotational axis of the mirror, the optical system 5 is so constructed as to maintain a conjugate relationship in view of geometrical optics between a starting point of deflection of light on the reflection surfaces of the polygonal mirror 4 and the target surface.

Because the first imaging optical system 3 is constructed by a vari-focal liquid crystal lens, as mentioned above, the vari-focal liquid crystal lens can vary the focal length of the first imaging optical system 3 in accordance with the deflection scanning of the reflection surfaces of the polygonal mirror 4 so as to shift a position of a linear image of light formed by the first optical system 3 along the optical path thereof. Shifting of the position of the linear image along the optical path of the first optical system 3 causes the imaging position of the second imaging optical system 5 to be shifted in the direction of sub-scanning in accordance with the longitudinal magnification of the second imaging optical system 5. As the result, curvature of field in the direction of sub-scanning can be corrected.

Generally, the vari-focal liquid crystal lens has refraction properties in that it exhibits anisotropy of index of refraction or birefringence at relatively low temperature, i.e., lower than 30° to 40° C. and in that it exhibits isotropy thereof at a temperature higher than 40° C. and thus causes the index of refraction not to be changed, as aforementioned. Therefore, in the case that the vari-focal liquid crystal lens is used as the first imaging optical system 3 of the scanning optical apparatus, when the liquid crystal lens is exposed at a temperature higher than 40° C., the liquid crystal lens can not vary the focal length thereof and thus makes it impossible to correct curvature of field in the direction of sub-scanning.

It is known in the art that an internal temperature of the scanning optical apparatus may be raised up to 40° to a range of 50° C. Thus the above-mentioned problem may occur.

For the purpose of eliminating such problems, the scanning optical apparatus of the present invention comprises temperature control means for controlling the temperature of the vari-focal liquid crystal lens as the first imaging optical system 3.

More specifically, the vari-focal liquid crystal lens 3 is provided at its outer peripheral side with a Peltier element 8 and a temperature detecting element 9 so as not to block off the light beam. These elements 8 and 9 are electrically connected to a temperature controller 7, respectively. The controller 7 is adapted to control the temperature of the vari-focal liquid crystal lens by controlling electric current which is to be supplied to the Peltier element 8 in response to the temperature detected by the temperature detecting element 9 so as to maintain the vari-focal liquid crystal lens at a predetermined temperature at which the liquid crystal lens maintains anisotropy of index of refraction.

Explanation will now be made in more detail as to embodiments of the vari-focal lens which is used as a first imaging optical system of the scanning optical apparatus.

Figure 2:
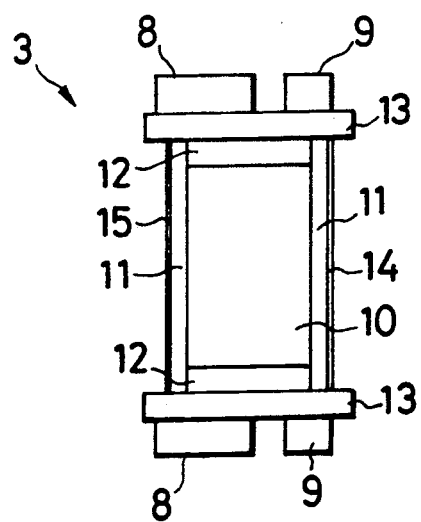
FIG. 2 schematically shows a cross section of a vari-focal liquid crystal lens as a first imaging optical system of the scanning optical apparatus shown in FIG. 1.

FIG. 2 is a schematical cross-sectional view of an embodiment of the vari-focal liquid crystal lens 3 for use in the scanning optical apparatus shown in FIG. 1, in which the above-mentioned Peltier element 8 and the temperature detecting element 9 are used.

In FIG. 2, the vari-focal liquid crystal lens 3 includes a liquid crystal lens body which comprises two spaced parallel cover glasses 11 and an annular spacer or seal member 12 which is disposed between the cover glasses 11 so as to form therebetween a sealed cavity which is filled with liquid crystal 10. The liquid crystal lens body is supported at outer peripheral side thereof on an annular support member 13 which in turn are provided at its outer peripheral side with the Peltier element 8 and the temperature detecting element 9.

Although the arrangement of the apparatus illustrated in FIG. 2 is such that most of all the outer peripheral side of the support member 13 is covered with the Peltier element 8 and the temperature detecting element 9, the peripheral side of the liquid crystal lens may be partially covered with one or more elements 8 and 9. Further, although the arrangement of the apparatus illustrated in FIG. 2 is such that the Peltier element 8 and the temperature detecting element 9 are disposed outside the support members 13, they may be disposed inside the support members or at positions so as to be directly brought into contact with the liquid crystal lens body.

Figure 3:
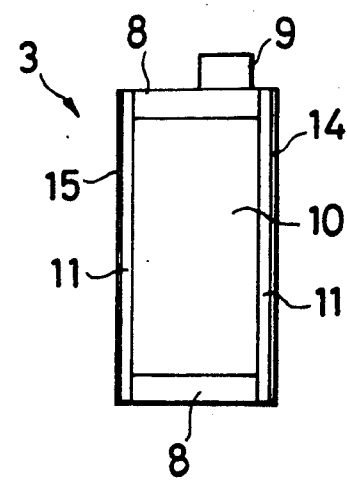
FIG. 3 schematically shows a cross section of an alternative vari-focal liquid crystal lens as the first imaging optical system of the scanning optical apparatus shown in FIG. 1.

Referring now to FIG. 3, there is shown an alternative vari-focal liquid crystal lens 3 in which the annular seal member 12 is partially or entirely made of Peltier element and is provided with the temperature detecting element 9 secured on the outer peripheral side thereof.

In the vari-focal liquid crystal lenses shown in FIGS. 2 and 3, the cover glasses 11 are provided at their outer surfaces with transparent electrodes 14 and 15, respectively, which are adapted to impress voltage on the liquid crystal for generating changes in orientation properties of the crystal liquid and thereby to generate changes in the index of refraction thereof, in order to vary the focal length of the liquid crystal lens.

With the vari-focal liquid crystal lens 3 having the Peltier element 8 and the temperature detecting element 9 as shown in FIG. 2 or FIG. 3, the temperature controller (FIG. 1) can control the Peltier element 8 on the basis of the temperature detected by the temperature detecting element 9 so as to maintain the liquid crystal lens at a temperature at which it maintain anisotropy of index of refraction. Accordingly, it is possible to maintain a stable anisotropy of index of refraction even when an internal temperature of the scanning optical apparatus rises over a temperature which is suitable for the operation of liquid crystal lens, and thereby to effect reliable correction of curvature of field in the direction of sub-scanning. As the result, an uniformity of diameter of a beam spot on the target surface can be easily and reliably maintained, and accordingly, it is easy to obtain a reliable high-density optical scanning.

While the invention has been described in conjunction with specific embodiments thereof, it is evident that many alternatives and modifications will be apparent to those skilled in the art in light of the foregoing description. Accordingly, it is intended to include all such alternatives and modifications as fall within the spirit and scope of the appended claims.

What is claimed is:

1. A scanning optical apparatus, comprising:
   a first imaging optical system for imaging a light beam collimated by a collimating optical system so as to form a linear image, the first imaging optical system including a vari-focal lens using a liquid crystal;
   a scanning deflector for deflecting a light beam emerging from the first imaging optical system at a reflection surface thereof and for scanning a target surface with the deflected light beam;
   a second imaging optical system for imaging the light beam deflected from the scanning deflector on the target surface;
   a first means for varying a focal length of the vari-focal lens in accordance with a deflection scanning of the reflection surface of the scanning deflector to correct curvature of field in a direction of sub-scanning, the vari-focal lens including a pair of spaced cover glasses, a pair of spaced seal members disposed between the spaced cover glasses to form a sealed cavity, in which the liquid crystal is enclosed, and transparent electrodes provided on the spaced cover glasses, respectively, the transparent electrodes being adapted to impress a voltage on the liquid crystal to vary the focal length of the vari-focal lens; and
   a second means being provided with a temperature detecting element which detects the temperature of the vari-focal lens and a temperature control element which controls the temperature of the vari-focal lens in response to the temperature detected by the temperature detecting element so as to maintain the vari-focal lens at a predetermined temperature;
   at least a part of the seal member comprising the temperature control element, while the temperature detecting element is located outside the seal member.

2. A scanning optical apparatus, comprising:
   a first imaging optical system for imaging a light beam collimated by a collimating optical system so as to form a linear image, the first imaging optical system including a vari-focal lens using a liquid crystal;
   a scanning deflector for deflecting a light beam emerging from the first imaging optical system at a reflection surface thereof and for scanning a target surface with the deflected light beam;
   a second imaging optical system for imaging the light beam deflected from the scanning deflector on the target surface;
   a first means for varying a focal length of the vari-focal lens in accordance with a deflection scanning of the reflection surface of the scanning deflector to correct curvature of field in a direction of sub-scanning, the vari-focal lens including a pair of spaced cover glasses, a pair of spaced seal members disposed between the spaced cover glasses to form a sealed cavity, in which the liquid crystal is enclosed, and transparent electrodes provided on the spaced cover glasses, respectively, the transparent electrodes being adapted to impress a voltage on the liquid crystal to vary the focal length of the vari-focal lens; and a second means being provided with a temperature detecting element which detects the temperature of the vari-focal lens and a Peltier element which controls the temperature of the vari-focal lens in response to the temperature detected by the temperature detecting element so as to maintain the vari-focal lens at a predetermined temperature.

* * * * *